United States Patent
Vlachos

(10) Patent No.: US 10,297,077 B1
(45) Date of Patent: May 21, 2019

(54) HIDDEN AREA STENCIL MESH RENDERING SYSTEMS AND METHODS

(71) Applicant: VALVE CORPORATION, Bellevue, WA (US)

(72) Inventor: Alex Vlachos, Bellevue, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

(21) Appl. No.: 15/443,558

(22) Filed: Feb. 27, 2017

Related U.S. Application Data

(60) Provisional application No. 62/302,695, filed on Mar. 2, 2016.

(51) Int. Cl.
- *G06T 19/00* (2011.01)
- *G06T 17/20* (2006.01)
- *G06T 13/40* (2011.01)
- *G06T 15/40* (2011.01)

(52) U.S. Cl.
CPC .............. *G06T 17/20* (2013.01); *G06T 13/40* (2013.01); *G06T 15/405* (2013.01)

(58) Field of Classification Search
CPC ....... G06T 11/00; G06T 11/40; G06T 15/205; G06T 1/60; G06T 2207/20016; G06T 3/4053; G06T 3/60; G06T 3/602; G06T 5/005; G06T 7/0075
See application file for complete search history.

(56) References Cited

U.S. PATENT DOCUMENTS

| | | | |
|---|---|---|---|
| 6,320,580 B1 * | 11/2001 | Yasui ...................... | G06T 15/40 345/421 |
| 8,427,487 B1 * | 4/2013 | Crow ...................... | G06T 11/40 345/501 |
| 2004/0070587 A1 * | 4/2004 | Cosman .................. | G06T 17/20 345/620 |
| 2011/0285742 A1 * | 11/2011 | Kilgard ................. | G06T 11/203 345/589 |
| 2012/0154277 A1 * | 6/2012 | Bar-Zeev ............. | G02B 27/017 345/158 |
| 2012/0235988 A1 * | 9/2012 | Karafin ................ | H04N 13/261 345/419 |
| 2014/0062865 A1 * | 3/2014 | Fateh .................... | G06T 11/206 345/156 |
| 2014/0247277 A1 * | 9/2014 | Guenter .................. | G06T 11/00 345/611 |
| 2015/0287158 A1 * | 10/2015 | Cerny ..................... | G06F 3/013 345/553 |
| 2015/0294498 A1 * | 10/2015 | Mei .......................... | G06T 1/20 345/420 |
| 2016/0086378 A1 * | 3/2016 | Shuster .................. | G06F 3/013 345/633 |

\* cited by examiner

Primary Examiner — Sultana M Zalalee
(74) Attorney, Agent, or Firm — Lee & Hayes, P.C.

(57) ABSTRACT

Systems and methods for implementing hidden mesh (or stencil mesh) graphics rendering techniques for use in applications such as head mounted displays ("HMDs") are described. Exemplary systems and algorithms are disclosed for masking or eliminating pixels in an image from the list of pixels to be rendered, based on the observation that a significant number of pixels in the periphery of HMD images cannot be seen, due to the specific details of the optical and display/electronics performance of each particular implementation.

9 Claims, 17 Drawing Sheets

400

500

700

800

HIDDEN AREA STENCIL MESH RENDERING SYSTEMS AND METHODS

CROSS-REFERENCE TO RELATED APPLICATIONS

This application claims the benefit of Provisional Application Ser. No. 62/302,695, filed on Mar. 2, 2016, the contents of which are herein incorporated by reference in their entirety for all purposes.

BACKGROUND OF THE DISCLOSURE

1. Field of the Disclosure

The disclosure relates generally to computer graphics processing. Certain aspects of the present disclosure relate more specifically to hidden area stencil mesh graphics rendering techniques to improve performance in applications such as head mounted displays ("HMDs").

2. General Background

In the technical fields of image processing and computer graphics, for example for HMD application, a relatively complicated optical arrangement exists, comprising the user's eyes, which are behind a set of lenses that then project onto display panels. Notably, however, not all of the pixels that could be rendered on the display panels in a typical implementation can actually be seen by the user as a practical matter, due to various factors. For example, lenses used in HMD applications may produce a radially symmetric distortion, which effectively results in the projection of a circular area onto the display panels. Any pixels that are located outside that circular area will typically be impossible see. Implementing technology to efficiently eliminate the pixels that cannot be seen from the list of pixels to be rendered would be desirable because it results in performance gains at little or no detriment to the user's experience.

Thus, it is desirable to address the current limitations in this art.

BRIEF DESCRIPTION OF THE DRAWINGS

By way of example, reference will now be made to the accompanying drawings, which are not to scale.

DETAILED DESCRIPTION

Figure 1:
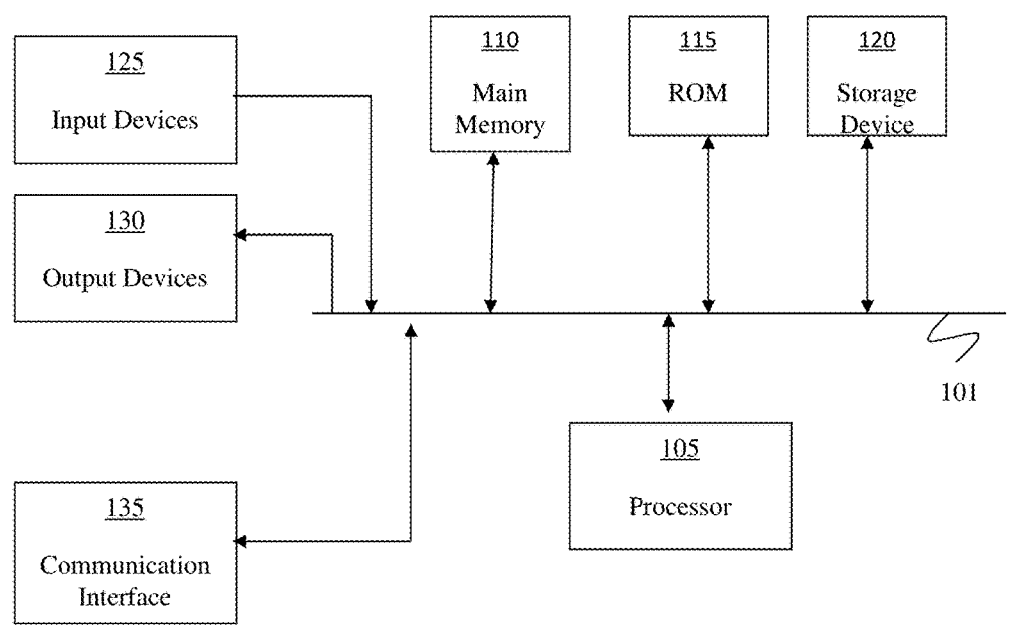
FIG. 1 is an exemplary diagram of a computing device that may be used to implement aspects of certain embodiments of the present invention.

Those of ordinary skill in the art will realize that the following description of the present invention is illustrative only and not in any way limiting. Other embodiments of the invention will readily suggest themselves to such skilled persons, having the benefit of this disclosure, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. Reference will now be made in detail to specific implementations of the present invention as illustrated in the accompanying drawings. The same reference numbers will be used throughout the drawings and the following description to refer to the same or like parts.

Certain figures in this specification may be flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks.

Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

For example, any number of computer programming languages, such as C, C++, C# (CSharp), Perl, Ada, Python, Pascal, SmallTalk, FORTRAN, assembly language, and the like, may be used to implement aspects of the present invention. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of functions.

In the following description, certain embodiments are described in terms of particular data structures, preferred and optional enforcements, preferred control flows, and examples. Other and further application of the described methods, as would be understood after review of this application by those with ordinary skill in the art, are within the scope of the invention.

The term "machine-readable medium" should be understood to include any structure that participates in providing data which may be read by an element of a computer system. Such a medium may take many forms, including but not limited to, non-volatile media, volatile media, and transmission media. Non-volatile media include, for example, optical or magnetic disks and other persistent memory. Volatile media include dynamic random access memory (DRAM) and/or static random access memory (SRAM). Transmission media include cables, wires, and fibers, including the wires that comprise a system bus coupled to processor. Common forms of machine-readable media include, for example and without limitation, a floppy disk, a flexible disk, a hard disk, a magnetic tape, any other magnetic medium, a CD-ROM, a DVD, any other optical medium.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

FIG. 1 is an exemplary diagram of a computing device 100 that may be used to implement aspects of certain embodiments of the present invention. Computing device 100 may include a bus 101, one or more processors 105, a main memory 110, a read-only memory (ROM) 115, a storage device 120, one or more input devices 125, one or more output devices 130, and a communication interface 135. Bus 101 may include one or more conductors that permit communication among the components of computing device 100. Processor 105 may include any type of conventional processor, microprocessor, or processing logic that interprets and executes instructions. Main memory 110 may include a random-access memory (RAM) or another type of dynamic storage device that stores information and instructions for execution by processor 105. ROM 115 may include a conventional ROM device or another type of static storage device that stores static information and instructions for use by processor 105. Storage device 120 may include a magnetic and/or optical recording medium and its corresponding drive. Input device(s) 125 may include one or more conventional mechanisms that permit a user to input information to computing device 100, such as a keyboard, a mouse, a pen, a stylus, handwriting recognition, voice recognition, biometric mechanisms, and the like. Output device(s) 130 may include one or more conventional mechanisms that output information to the user, including a display, a projector, an A/V receiver, a printer, a speaker, and the like. Communication interface 135 may include any transceiver-like mechanism that enables computing device/server 100 to communicate with other devices and/or systems. Computing device 100 may perform operations based on software instructions that may be read into memory 110 from another computer-readable medium, such as data storage device 120, or from another device via communication interface 135. The software instructions contained in memory 110 cause processor 105 to perform processes that will be described later. Alternatively, hardwired circuitry may be used in place of or in combination with software instructions to implement processes consistent with the present invention. Thus, various implementations are not limited to any specific combination of hardware circuitry and software.

In certain embodiments, memory 110 may include without limitation high-speed random access memory, such as DRAM, SRAM, DDR RAM or other random access solid state memory devices; and may include without limitation non-volatile memory, such as one or more magnetic disk storage devices, optical disk storage devices, flash memory devices, or other non-volatile solid state storage devices. Memory 110 may optionally include one or more storage devices remotely located from the processor(s) 105. Memory 110, or one or more of the storage devices (e.g., one or more non-volatile storage devices) in memory 110, may include a computer readable storage medium. In certain embodiments, memory 110 or the computer readable storage medium of memory 110 may store one or more of the following programs, modules and data structures: an operating system that includes procedures for handling various basic system services and for performing hardware dependent tasks; a network communication module that is used for connecting computing device 110 to other computers via the one or more communication network interfaces and one or more communication networks, such as the Internet, other wide area networks, local area networks, metropolitan area networks, and so on; a client application that may permit a user to interact with computing device 100.

Figure 2:
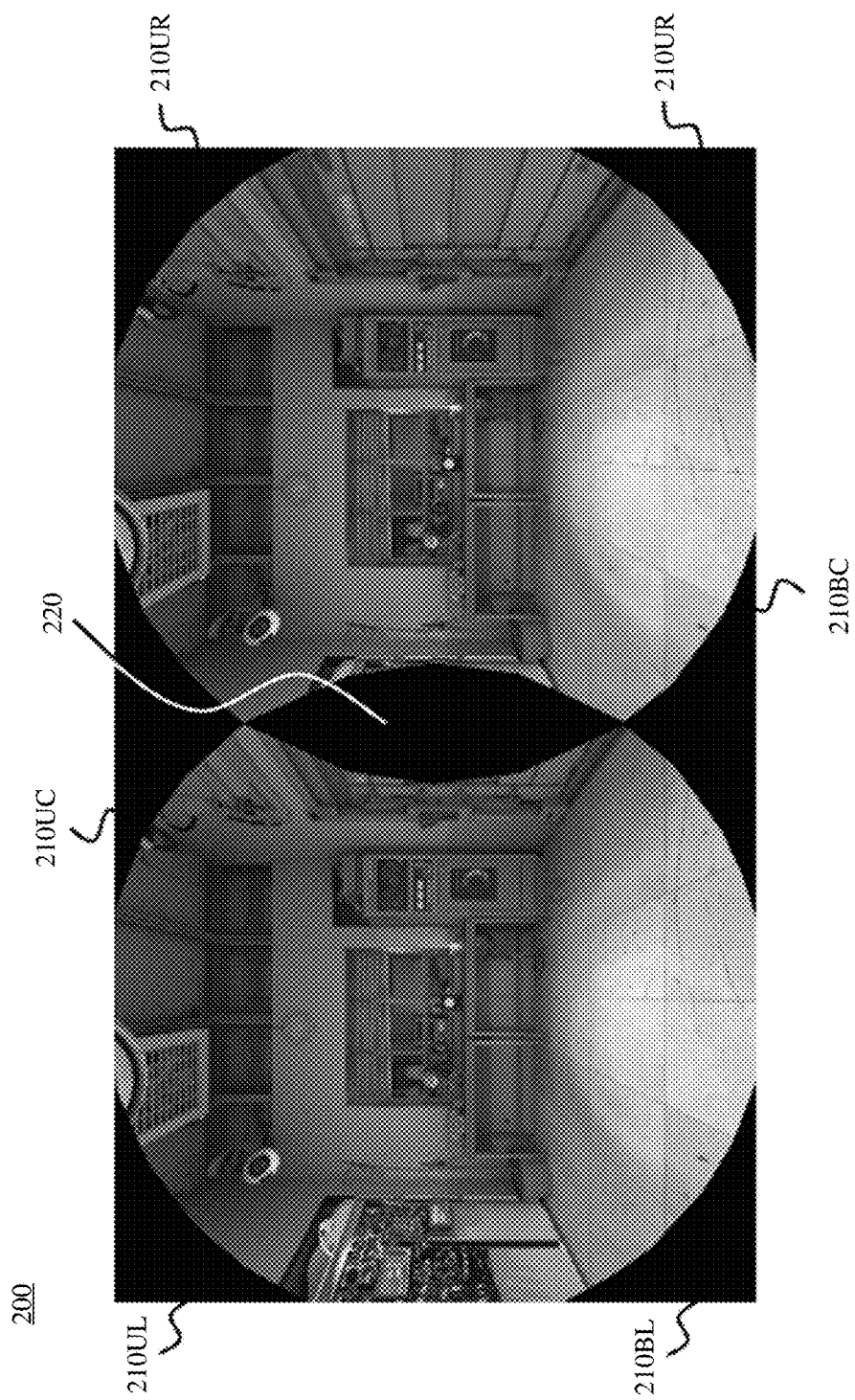
FIG. 2 is an exemplary graphics image, depicting the pixel regions that can be seen in an exemplary HMD, surrounded by the black regions of pixels that cannot be seen, according to aspects of the present invention.

In certain embodiments, as depicted in image 200 of FIG. 2, a hidden area mesh used in HMD applications masks all of the black pixels in the peripheral areas 210UL, 210UR, 210UC, 210BC, 210BL, 210BR and in the central overlap area 220 of the two circular areas.

Figure 3:
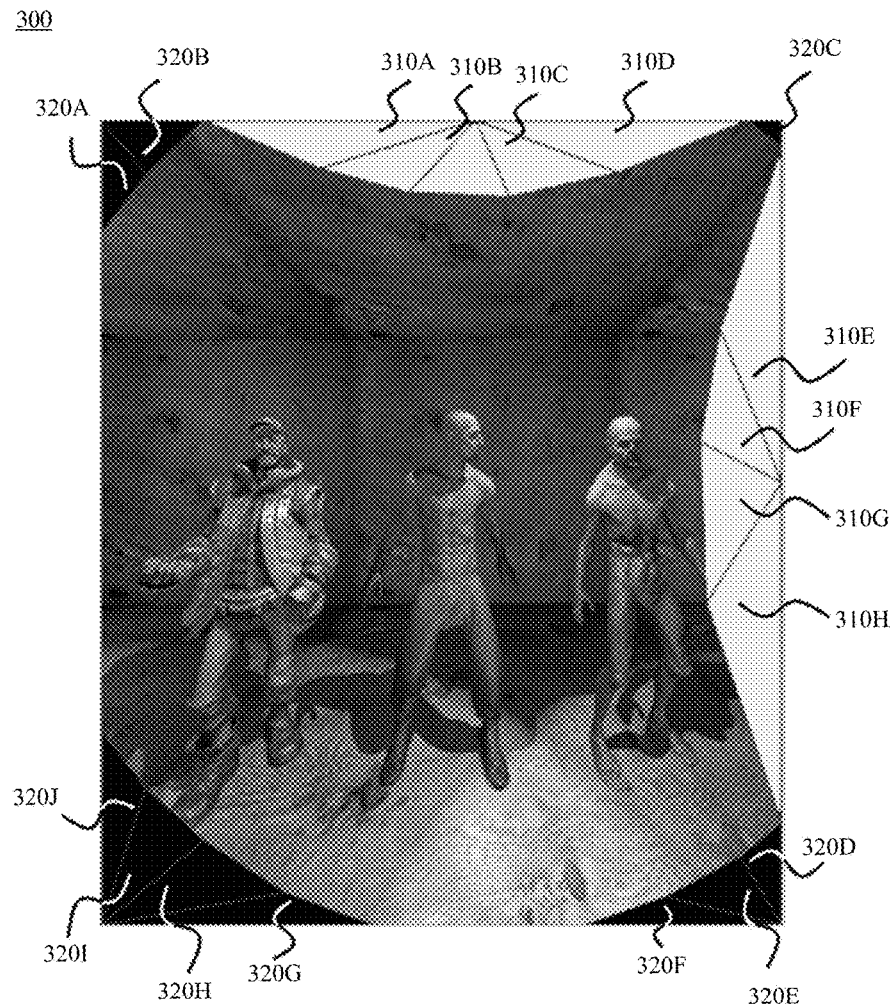
FIG. 3 is an exemplary graphics image, depicting a triangle-based mesh to define the regions of pixels that cannot be seen in an HMD image (left eye) according to aspects of the present invention.

Depending on the particular requirements of each implementation, the stencil mask may be automatically generated using the inverse of a function used generate a distortion mesh, as is known to skilled artisans. For example, referring to the mesh depicted in image 300 of FIG. 3, that would generate the triangles/polygons 310A-310H in the lighter regions at the right and top of the image. The rest of the triangles/polygons 320A-320J in a stencil mesh according to aspects of the present invention may be based, for example, on a physical visibility determination, e.g., by visual observation of the display panels with the user's eyeballs as close to the lenses as practically possible.

In certain embodiments, some areas of the unwarped render target are either thrown away during the warp stage or out of view from the user due to the user not being able to see some corners of the panel. A method for masking off these pixels using the stencil buffer according to certain embodiments effectively reduces the number of pixels that must be rendered significantly, for example by approximately 17% in experiments conducted by the inventor.

Embodiments of the present invention stencil out the pixels that cannot actually be seen through the lenses, taking advantage of the fact that graphical processing units ("GPUs") typically used in applications such as HMDs are fast at early stencil-rejection. Alternatively rendering can be targeted to the depth buffer at near z so everything early z-rejects instead.

Figure 4:
FIG. 4 is an exemplary graphics image, depicting how the unwarped render corresponding to FIG. 3 appeared (looking only at the left eye image) before application of techniques according to aspects of the present invention.
Figure 5:
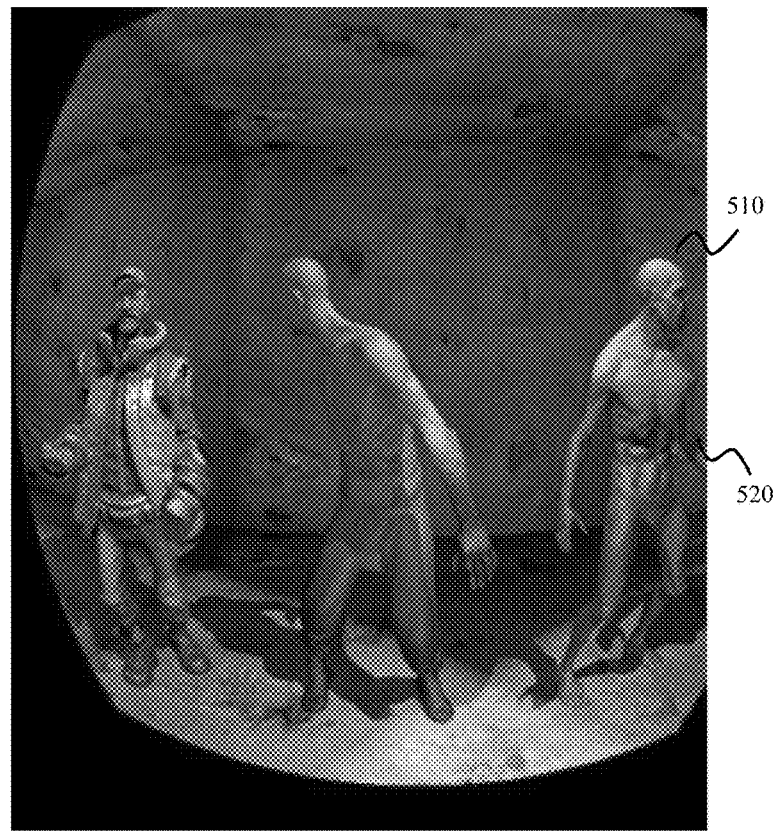
FIG. 5 is an exemplary graphics image, depicting how an image similar to that shown in FIG. 4 appears after application of warping techniques according to aspects of the present invention.
Figure 6:
FIG. 6 is a graphic image which depicts the location and definition of a 19-triangle mesh with respect to an image similar to that shown in FIG. 4, according to aspects of the present invention, to mask areas of the render.
Figure 7:
FIG. 7 is a graphic image which depicts the unwarped version of an image similar to FIG. 6, after the hidden pixels are masked according to aspects of the present invention.
Figure 8:
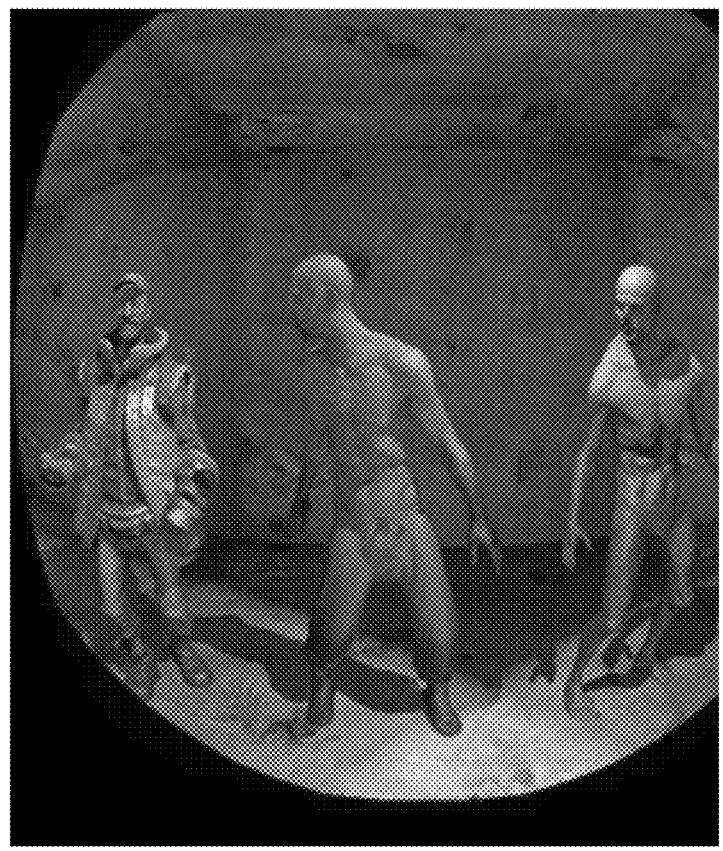
FIG. 8 is a graphic image which depicts a new warped image corresponding to an image similar to that shown in FIG. 7, according to aspects of the present invention.

The greyscale version image 400 depicted in FIG. 4 shows how the unwarped render appears (looking only at the left eye image 410) before application of techniques according to aspects of the present invention. After warping, it appears like the image 500 depicted in FIG. 5. It should be noted that the "zombie" 510 on the right side of the image gets his hand 520 cut off after warping along with a large area to the right of that location. A 19-triangle mesh 610 to mask areas of the render was implemented according to aspects of the present invention (see in image 600, FIG. 6), and mirrored for the other eye. FIG. 7 (700) depicts the unwarped image after the hidden pixels are masked, and the new warped image is depicted in FIG. 8 (800).

Figure 9:
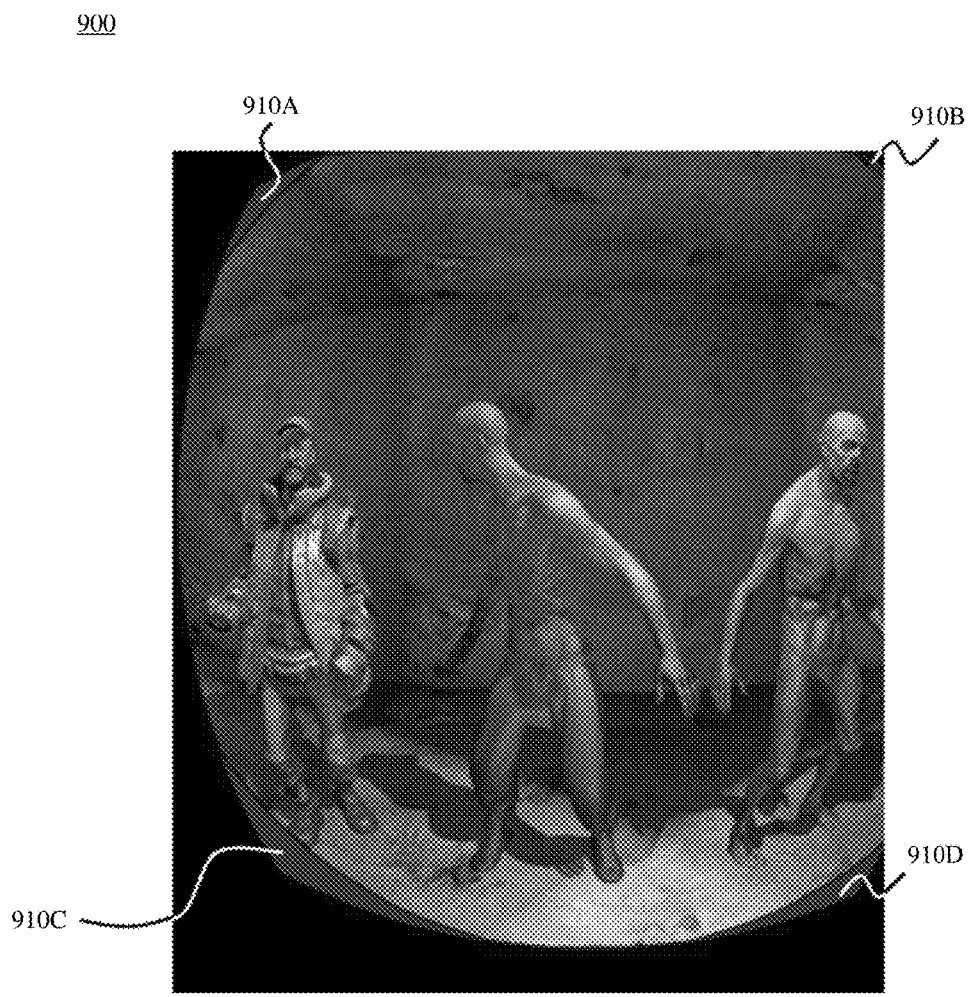
FIG. 9 is an exemplary image, depicting pixels (in the three gray areas between the central image and the black surrounding areas) that include the pixels that are blacked out with stencil masks according to aspects of the present invention.

In certain embodiments, many of the pixels that are discarded are not included in the final render, but some of them are. Referring to image 900 in FIG. 9, the pixels in the four gray areas 910A, 910,B, 910C and 910D between the central image and the black areas include the pixels that are now blacked out with stencil masks according to aspects of the present invention, but these pixels are barely visible in the peripheral vision of a typical user when not looking directly at them, when the user's eyes are as close to the lenses as possible without touching the user's eyeballs to the lenses. However, when a typical user's eyeballs rotate to look directly at these gray areas, because the user's eyes are now in a different location, the typical user cannot see any of these gray pixels when looking directly at any of the corners. With masking techniques according to aspects of the present invention in certain embodiments, a typical user can see the same pixels, whether the user's eyes are staring straight ahead or directly at one of the corners.

Figure 10:
FIG. 10 is a graphic image which depicts the appearance of the final frame buffer after implementing techniques according to aspects of the present invention in certain embodiments.

FIG. 10 shows a greyscale version of image 1000 which depicts the appearance of the final frame buffer after implementing techniques according to aspects of the present invention in certain embodiments. Depending on the requirements of each particular implementation, even more of the warp mesh triangles that fall into the gray areas in FIG. 9 may be culled, for additional performance gains.

Figure 11:
FIG. 11 is a graphic image which depicts an exemplary image showing what the back buffer would send to the frame buffer in certain embodiments of the present invention.
Figure 12:
FIG. 12 is a graphic image which depicts a representation of FIG. 11 when all the pixels that cannot actually be seen are masked, according to aspects of the present invention.

FIG. 11 depicts an exemplary image 1100 showing what the back buffer would send to the frame buffer in certain embodiments. If all the pixels that cannot actually be seen are masked, the image 1200 appears as shown in FIG. 12, which actually matches the radial distortion of the lenses in the HMD. This is all closely tied to the optics design of the HMD system, such as how the optics are paired with the lenses, and how the lenses are aligned with the panels.

Figure 13:
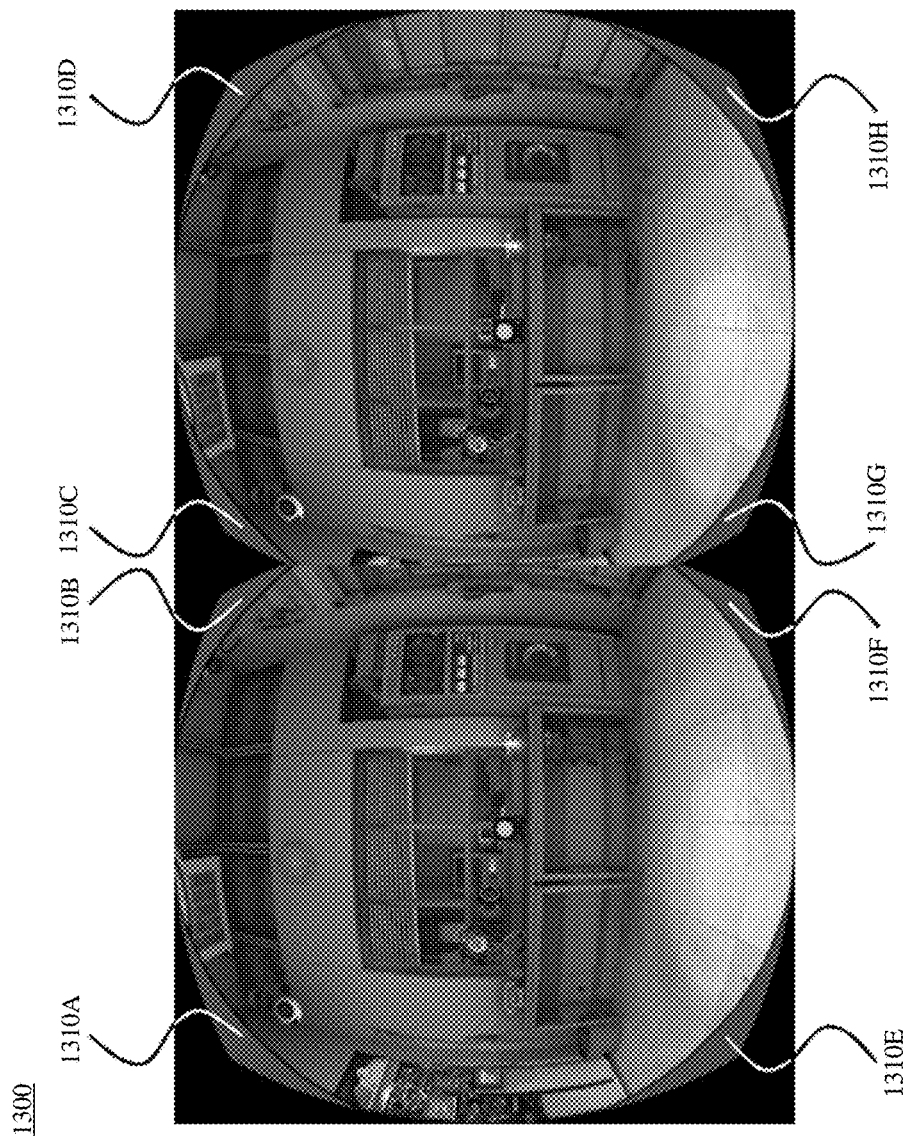
FIG. 13 is an exemplary image, depicting gray areas between the central image and the surrounding black areas according to aspects of the present invention, corresponding to pixels that cannot actually be seen in a typical implementation.

The gray areas 1310A-1310H shown in the image 1300 of FIG. 13, between the central image and the black areas, depict pixels that cannot actually be seen, so it is not worthwhile in terms of resource utilization to render them.

Figure 14:
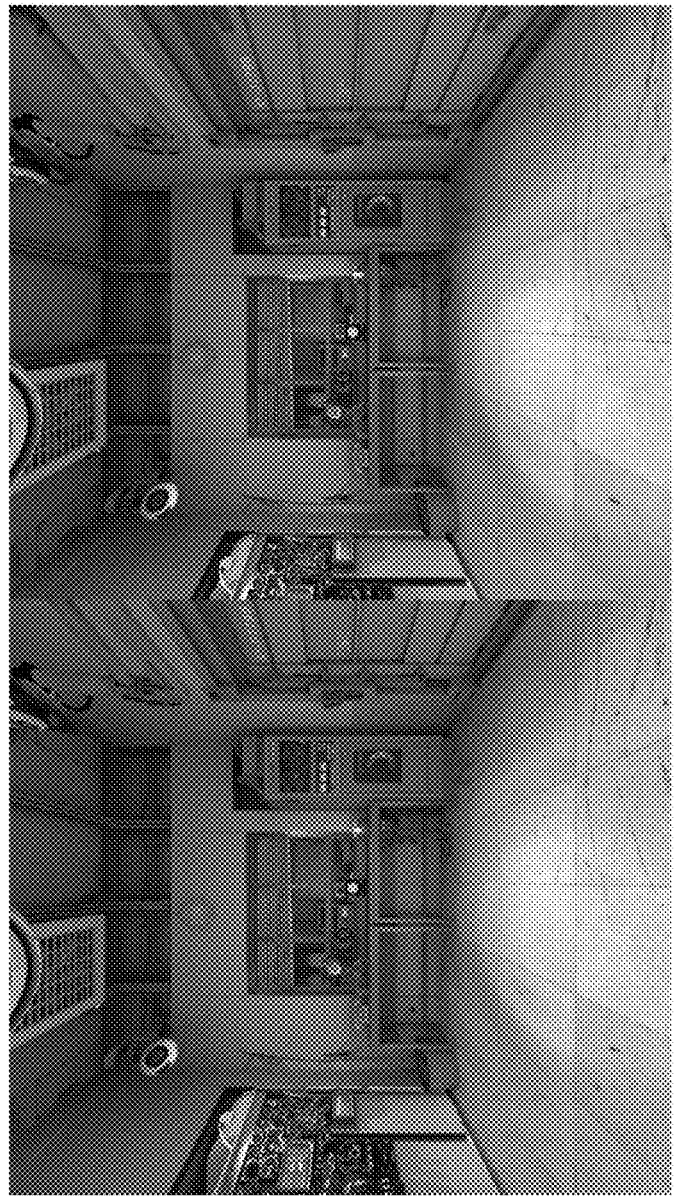
FIG. 14 is a graphic image which depicts an exemplary off-screen render target image corresponding to FIG. 13 (i.e., the image that is actually intended to be rendered, in an unmodified and unwarped view), according to aspects of the present invention.

Image 1400 depicted in FIG. 14 depicts the corresponding off-screen render target, i.e., the image that is actually intended to be rendered, in an unmodified and unwarped view.

Figure 15:
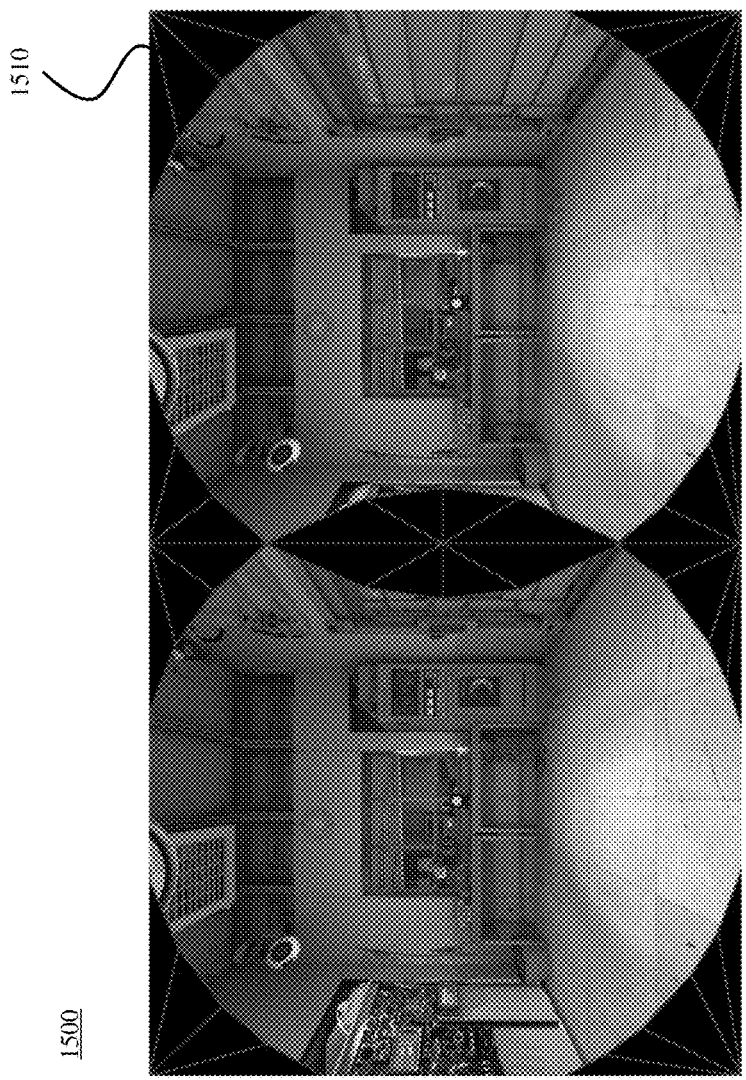
FIG. 15 is a graphic image which depicts an exemplary image depicting the overlay of a stencil mesh to the image shown in FIG. 14, according to aspects of the present invention.

If the stencil mesh 1510 according to aspects of the present invention is overlaid on the image, as seen in image 1500 of FIG. 15, the black areas defined by a mesh of triangles 1510 define the areas that include the pixels of the render target image that would typically never be seen. To optimize performance, these pixels are not rendered, according to aspects of the present invention. According to aspects of the present invention, all pixels that are determined to be located within the area defined by the rejection mesh (e.g. the gray areas in FIGS. 9 and 13, and the black areas in FIGS. 9, 13, and 15) are stencil rejected and thus not rendered.

Figure 16:
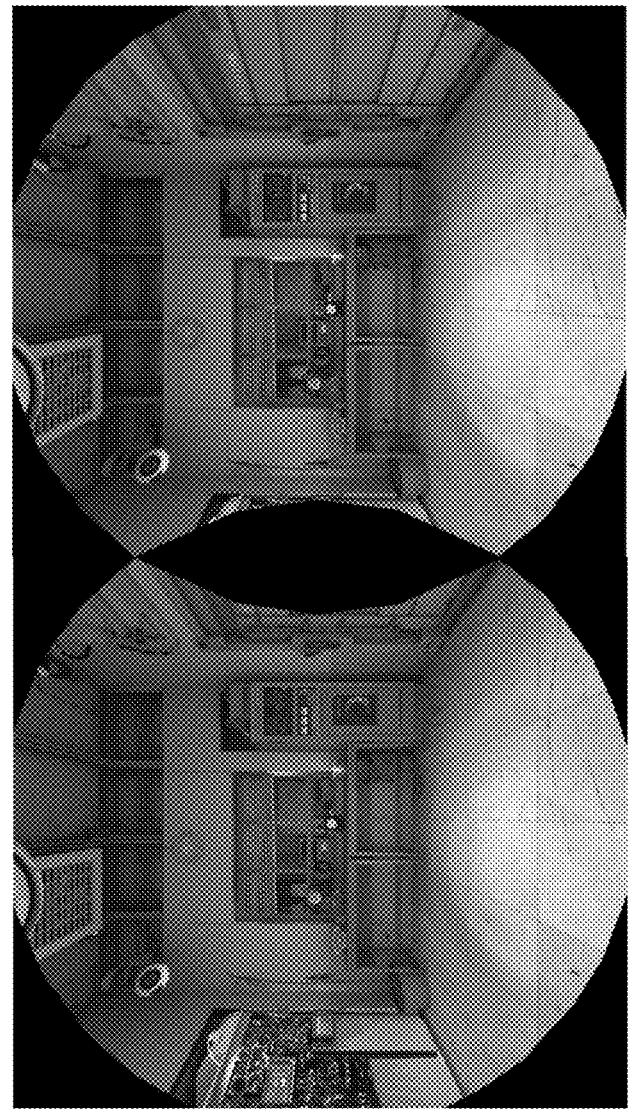
FIGS. 16 and 17 are exemplary images, depicting a before-and-after example of applying stencil mask techniques according to aspects of the present invention to eliminate rendering of pixels that are not seen in the output image to gain a performance benefit.
Figure 17:
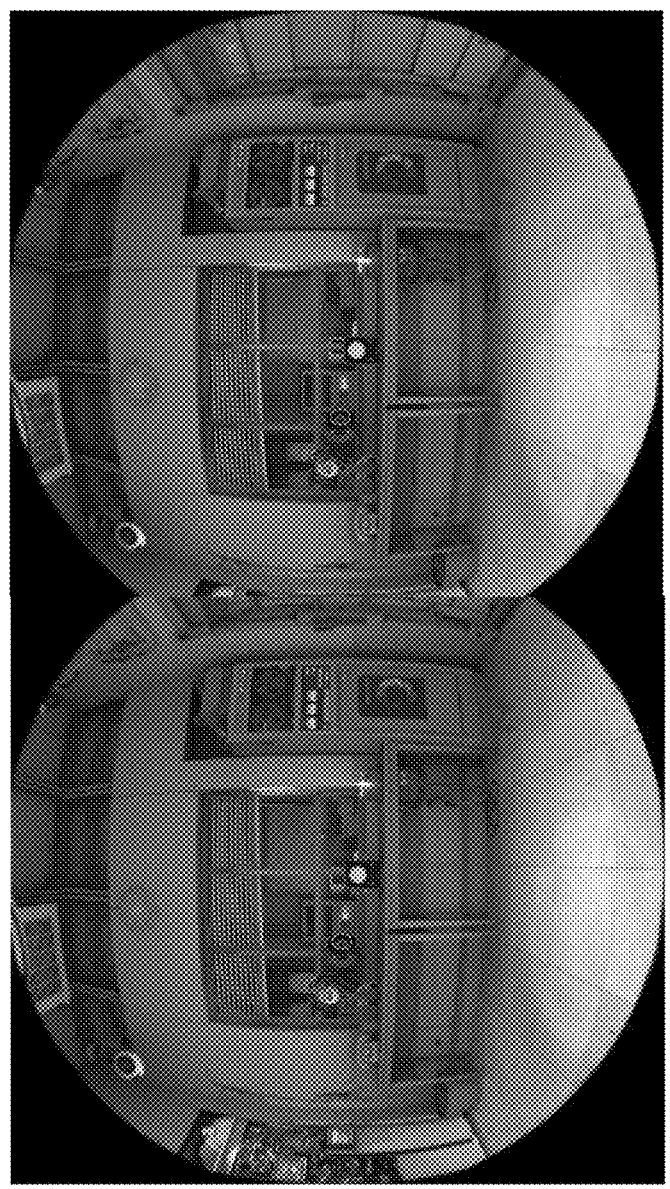

Greyscale images 1600 and 1700 in FIGS. 16 and 17 depict another before-and-after example of applying stencil mask techniques according to aspects of the present invention to eliminate rendering of pixels that are not seen in the output image to gain a performance benefit.

Skilled artisans will recognize that the stencil mesh according to aspects of the present invention will be different for each particular HMD implementation, depending on the specific details of the optics and display electronics in the implementation.

While the above description contains many specifics and certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art, as mentioned above. The invention includes any combination or sub-combination of the elements from the different species and/or embodiments disclosed herein.

What is claimed is:

1. A graphics processing method, comprising:
    applying a masking rendering algorithm to a portion of a digital image to mask out one or more peripheral pixels of the digital image, wherein the one or more peripheral pixels are located in an area within a peripheral vision of a user when the user is not looking directly at the one or more peripheral pixels in a head-mounted display system, wherein the masking rendering algorithm comprises a stencil mask that is automatically generated using an inverse of a function used to generate a distortion mesh associated with the head-mounted display system; and culling the one or more peripheral pixels from the digital image, wherein subsequent processing of the digital image after applying the masking rendering algorithm excludes the one or more peripheral pixels so as to produce performance gains without detriment to an experience of the user.

2. The graphics processing method of claim 1, wherein the masking rendering algorithm further comprises a hidden area mesh.

3. The graphics processing method of claim 1, further comprising generating the stencil mask based on a physical visibility determination associated with the head-mounted display system.

4. A graphics processing system, comprising:

one or more processors; and computer-readable media storing computer-executable instructions that, when executed by the one or more processors, cause the one or more processors to perform operations comprising:

applying a masking rendering algorithm to a portion of a digital image to mask out one or more peripheral pixels of the digital image, wherein the one or more peripheral pixels are located in an area within a peripheral vision of a user when the user is not looking directly at the one or more peripheral pixels in a head-mounted display system, wherein the masking rendering algorithm comprises a stencil mask that is automatically generated using an inverse of a function used to generate a distortion mesh associated with the head-mounted display system; and culling the one or more peripheral pixels from the digital image, wherein subsequent processing of the digital image after applying the masking rendering algorithm excludes the one or more peripheral pixels.

5. The graphics processing system of claim 4, wherein the masking rendering algorithm further comprises a hidden area mesh.

6. The graphics processing system of claim 4, further comprising generating the stencil mask based on a physical visibility determination associated with the head-mounted display system.

7. A computer-readable memory storing computer-executable instructions that, when executed by one or more processors, cause the one or more processors to perform operations comprising:

masking out one or more peripheral pixels of a digital image displayed in a head-mounted display system by applying a masking rendering algorithm to the digital image, wherein the one or more peripheral pixels are located in a peripheral area of the digital image, wherein the masking rendering algorithm comprises a stencil mask;

automatically generating the stencil mask using an inverse of a function used to generate a distortion mesh associated with the head-mounted display system;

culling the one or more peripheral pixels from the digital image; and processing the digital image, excluding the one or more peripheral pixels, after applying the masking rendering algorithm.

8. The computer-readable memory of claim 7, wherein the masking rendering algorithm further comprises a hidden area mesh.

9. The computer-readable memory of claim 7, the operations further comprising generating the stencil mask based on a physical visibility determination associated with the head-mounted display system.

* * * * *